(12) United States Patent
Lin et al.

(10) Patent No.: US 10,952,207 B2
(45) Date of Patent: Mar. 16, 2021

(54) METHOD FOR TRANSMITTING DATA, TERMINAL DEVICE AND NETWORK DEVICE

(71) Applicant: GUANGDONG OPPO MOBILE TELECOMMUNICATIONS CORP., LTD., Guangdong (CN)

(72) Inventors: Yanan Lin, Guangdong (CN); Hua Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 64 days.

(21) Appl. No.: 16/576,157

(22) Filed: Sep. 19, 2019

(65) Prior Publication Data

US 2020/0092872 A1  Mar. 19, 2020

Related U.S. Application Data

(63) Continuation of application No. PCT/CN2017/077284, filed on Mar. 20, 2017.

(51) Int. Cl.
*H04W 72/04* (2009.01)

(52) U.S. Cl.
CPC ....... *H04W 72/044* (2013.01); *H04W 72/042* (2013.01)

(58) Field of Classification Search
None
See application file for complete search history.

(56) References Cited

U.S. PATENT DOCUMENTS

2008/0101438 A1  5/2008  Lee et al.
2009/0041092 A1  2/2009  Kim et al.
(Continued)

FOREIGN PATENT DOCUMENTS

CN  101888702 A  11/2010
CN  103076911 A  5/2013
(Continued)

OTHER PUBLICATIONS

The second Office Action of corresponding Chinese application No. 201780088279.5, dated Sep. 8, 2020.
(Continued)

*Primary Examiner* — Eunsook Choi
(74) *Attorney, Agent, or Firm* — Ladas & Parry LLP

(57) ABSTRACT

A method for transmitting data including: receiving, by a terminal device, first resource indication information transmitted by a network device, the first resource indication information indicates a first frequency domain resource for transmitting a target channel in at least one time domain resource unit, a time domain resource for transmitting the target channel on a plurality of frequency domain resource units of the first frequency domain resource is same; receiving, by the terminal device, second resource indication information transmitted by the network device, the second resource indication information indicates a time domain resource for transmitting the target channel on each of a plurality of frequency domain resource units of a second frequency domain resource in the at least one time domain resource unit, time domain resources for transmitting the target channel on the plurality of frequency domain resource units of the second frequency domain resource are at least partially different.

20 Claims, 10 Drawing Sheets

(56) References Cited

U.S. PATENT DOCUMENTS

| | | | | |
|---|---|---|---|---|
| 2011/0317610 | A1* | 12/2011 | Park | H04L 5/0053 370/312 |
| 2012/0099553 | A1* | 4/2012 | Aiba | H04L 5/0053 370/329 |
| 2012/0275428 | A1* | 11/2012 | Feng | H04L 5/0064 370/330 |
| 2013/0121280 | A1* | 5/2013 | Ouchi | H04L 5/0048 370/329 |
| 2015/0131565 | A1* | 5/2015 | Nakashima | H04L 1/0026 370/329 |
| 2015/0333563 | A1 | 11/2015 | Rofougaran et al. | |
| 2017/0135105 | A1* | 5/2017 | Li | H04W 72/12 |
| 2018/0070369 | A1* | 3/2018 | Papasakellariou | H04W 16/14 |
| 2018/0227943 | A1* | 8/2018 | Xiao | H04W 72/1294 |
| 2018/0242306 | A1* | 8/2018 | Wong | H04W 76/10 |
| 2019/0053208 | A1* | 2/2019 | Zhang | H04W 72/042 |
| 2019/0159168 | A1* | 5/2019 | Wang | H04L 5/0037 |
| 2019/0208530 | A1* | 7/2019 | Gao | H04W 72/12 |

FOREIGN PATENT DOCUMENTS

| | | |
|---|---|---|
| CN | 103945538 A | 7/2014 |
| CN | 104301898 A | 1/2015 |
| CN | 105101429 A | 11/2015 |
| EP | 0695092 A1 | 1/1996 |
| WO | 2008027948 A2 | 3/2008 |
| WO | 2013107411 A1 | 7/2013 |
| WO | 2015155274 A1 | 10/2015 |
| WO | 2015160102 A1 | 10/2015 |

OTHER PUBLICATIONS

The SESR of corresponding European application No. 17902454.2, dated Feb. 14, 2020.

International Search Report dated Nov. 27, 2017 for Application No. PCT/CN2017/0772840.

The First Office Action of corresponding Chinese application No. 201780088279.5, dated Jun. 18, 2020.

Guangdong OPPO Mobile Telecom, 3GPP TSG RAN WG1 Meeting #88 R1-1701960, DL resource allocation and indication for NR, published on Feb. 17, 2017

Guangdong OPPO Mobile Telecom, 3GPP TSG RAN WG1 NR AdHoc R1-1700570, DL resource allocation and indication for NR, published on Jan. 20, 2017.

* cited by examiner

400

A terminal device receives first resource indication information transmitted by a network device, where the first resource indication information indicates a first frequency domain resource for transmitting a target channel in at least one time domain resource unit, and a time domain resource for transmitting the target channel on a plurality of frequency domain resource units of the first frequency domain resource is the same ~ 410

The terminal device receives second resource indication information transmitted by the network device, where the second resource indication information indicates a time domain resource for transmitting the target channel on each of a plurality of frequency domain resource units of a second frequency domain resource in the at least one time domain resource unit, and the time domain resources for transmitting the target channel on the plurality of frequency domain resource units of the second frequency domain resource are at least partially different ~ 420

The terminal device transmits the target channel to the network device or receives the target channel transmitted by the network device by using the same time domain resource on the plurality of frequency domain resource units of the first frequency domain resource, and transmits the target channel to the network device or receives the target channel transmitted by the network device by using a time domain resource unit indicated by the second resource indication information on the plurality of frequency domain resource units of the second frequency domain resource ~ 430

A network device determines a first frequency domain resource for transmitting a target channel in at least one time domain resource unit among frequency domain resources that can be used for channel transmission, where, the time domain resource for transmitting the target channel on a plurality of frequency domain resource units of the first frequency domain resource is the same  ~1210

The network device transmits first resource indication information to the terminal device, where, the first resource indication information is used for indicating the first frequency domain resource in the at least one time domain resource unit  ~1220

The network device transmits second resource indication information to the terminal device, where, the second resource indication information indicates a time domain resource for transmitting the target channel on each of a plurality of frequency domain resource units of the second frequency domain resource in the at least one time domain resource unit, and the time domain resources for transmitting the target channel on the plurality of frequency domain resource units of the second frequency domain resource are at least partially different  ~1230

The network device transmits the target channel to the terminal device or receives the target channel transmitted by the terminal device by using the same time domain resource on the plurality of frequency domain resource units of the first frequency domain resource, and transmits the target channel to the terminal device or receives the target channel transmitted by the terminal device by using a time domain resource unit indicated by the second resource indication information on the plurality of frequency domain resource units of the second frequency domain resource  ~1240

FIG. 12

METHOD FOR TRANSMITTING DATA, TERMINAL DEVICE AND NETWORK DEVICE

CROSS-REFERENCE TO RELATED APPLICATIONS

This application is a continuation of International Application No. PCT/CN2017/077284, filed on Mar. 20, 2017, which is hereby incorporated by reference in their entireties

TECHNICAL FIELD

Embodiments of the present application relate to the field of wireless communication, and more particularly, to a method for transmitting data, a terminal device and a network device.

BACKGROUND

In a 5G new radio (NR) system, some symbols in a time domain scheduling unit, such as a slot and a mini-slot, can be used for transmitting a control channel while other symbols are used for transmitting a data channel, and some symbols in a time domain scheduling unit are supported for transmitting a downlink channel while other symbols are supported for transmitting an uplink channel. And which symbols in a time domain scheduling unit are used for transmitting a control channel and which symbols are used for transmitting a data channel are indicated by a base station to a terminal through downlink control information (DCI).

Therefore, in the 5G NR system, dynamic multiplexing of time domain resources of the data channel and the control channel, and dynamic multiplexing of time domain resources of the downlink channel and the uplink channel can be realized through the indication of the DCI, which is beneficial to improving utilization of resources and shortening a time delay. However, such resource configuration manner increases the complexity of the base station and the terminal device, and causes a large amount of unnecessary control signaling overhead.

SUMMARY

Embodiments of the present application provide a method for transmitting data, a terminal device and a network device, which can reduce the control signaling overhead generated in a resource configuration process and reduce the complexity of the network device and the terminal device.

A first aspect provides a method for transmitting data, including: receiving, by a terminal device, first resource indication information transmitted by a network device, where the first resource indication information indicates a first frequency domain resource for transmitting a target channel in at least one time domain resource unit, a time domain resource for transmitting the target channel on a plurality of frequency domain resource units of the first frequency domain resource is the same, and the target channel includes a data channel or a control channel of the terminal device; and receiving, by the terminal device, second resource indication information transmitted by the network device, where the second resource indication information indicates a time domain resource for transmitting the target channel on each of a plurality of frequency domain resource units of a second frequency domain resource in the at least one time domain resource unit, time domain resources for transmitting the target channel on the plurality of frequency domain resource units of the second frequency domain resource are at least partially different, and the second frequency domain resource is other frequency domain resource that can be used for channel transmission other than the first frequency domain resource.

Therefore, the terminal device receives, only in part of the frequency domain resources, indication information transmitted by the network device for respectively indicating the time domain resource for transmitting the uplink/downlink channels on each frequency domain scheduling unit, while in other part of the frequency domain resource range, the time domain resources used by the terminal device for transmitting the uplink/downlink channels on a plurality of frequency domain scheduling units are the same preset time domain resources. Therefore, the terminal device does not need to respectively receive the indication of the transmission resource in each frequency domain resource unit transmitted by the network device in the entire frequency domain range, thereby reducing unnecessary control signaling overhead in the resource configuration process and reducing the complexity of the terminal device.

In an embodiment, in one implementation of the first aspect, the method further includes: transmitting, by the terminal device, the target channel to the network device, or receiving, by the terminal device, the target channel transmitted by the network device, by using the same time domain resource on the plurality of frequency domain resource units of the first frequency domain resource, and transmitting the target channel to the network device or receiving the target channel transmitted by the network device by using a time domain resource indicated by the second resource indication information on the plurality of frequency domain resource units of the second frequency domain resource.

In an embodiment, in one implementation of the first aspect, the method further includes: receiving, by the terminal device, information of the same time domain resource transmitted by the network device.

In an embodiment, in one implementation of the first aspect, the information of the same time domain resource includes at least one of the following: a starting symbol for the terminal device to transmit the target channel in the at least one time domain resource unit, a number of symbols for transmitting the target channel in the at least one time domain resource unit, a mini-slot for transmitting the target channel in the at least one time domain resource unit and a number of mini-slots for transmitting the target channel in the at least one time domain resource unit.

In an embodiment, in one implementation of the first aspect, the information of the same time domain resource includes an identifier of the same time domain resource, and the same time domain resource is a time domain resource corresponding to the identifier among a plurality of preset time domain resources.

In an embodiment, in one implementation of the first aspect, the first frequency domain resource includes a continuous frequency domain resource or a discontinuous frequency domain resource.

In an embodiment, in one implementation of the first aspect, the same time domain resource is all time domain resources in the at least one time domain resource unit.

In an embodiment, in one implementation of the first aspect, the time domain resource unit includes any one of the following: a slot, a mini-slot and a subframe.

In an embodiment, in one implementation of the first aspect, the data channel includes any one of the following: an uplink data channel, a downlink data channel and a sidelink data channel.

In an embodiment, in one implementation of the first aspect, where the receiving, by a terminal device, first resource indication information transmitted by the network device includes: receiving, by the terminal device, the first resource indication information transmitted by the network device through system information or radio resource control (RRC) signaling.

A second aspect provides a method for transmitting data, including: determining, by a network device, a first frequency domain resource for transmitting a target channel in at least one time domain resource unit among frequency domain resources that can be used for channel transmission, where a time domain resource for transmitting the target channel on a plurality of frequency domain resource units of the first frequency domain resource is the same, and the target channel includes a data channel or a control channel of the terminal device; transmitting, by the network device, first resource indication information to the terminal device, where the first resource indication information is used for indicating the first frequency domain resource in the at least one time domain resource unit; and transmitting, by the network device, second resource indication information to the terminal device, where the second resource indication information is used for indicating the time domain resources for transmitting the target channel on each of a plurality of frequency domain resource units of the second frequency domain resource in the at least one time domain resource unit, time domain resources for transmitting the target channel on the plurality of frequency domain resource units of the second frequency domain resource are at least partially different, and the second frequency domain resource is other frequency domain resource that can be used for channel transmission other than the first frequency domain resource.

Therefore, the network device respectively indicates, only in part of the frequency domain resources, time domain resources for transmitting the uplink/downlink channels on each frequency domain scheduling unit to the terminal device, while in other part of the frequency domain resource range, the time domain resource used by the terminal device for transmitting the uplink/downlink channels on the plurality of frequency domain scheduling units is the same preset time domain resources. Therefore, the network device does not need to respectively indicate the transmission resource in each frequency domain resource unit in the entire frequency domain range, thereby reducing unnecessary control signaling overhead in the resource configuration process and reducing the complexity of the network device.

In an embodiment, in one implementation of the second aspect, the method further includes: transmitting, by the network device, the target channel to the terminal device or receiving, by the network device, the target channel transmitted by the terminal device, by using the same time domain resource on the plurality of frequency domain resource units of the first frequency domain resource, and transmitting, the target channel to the terminal device or receiving the target channel transmitted by the terminal device by using a time domain resource unit indicated by the second resource indication information on the plurality of frequency domain resource units of the second frequency domain resource.

In an embodiment, in one implementation of the second aspect, the method further includes: transmitting, by the network device, the information of the same time domain resource to the terminal device.

In an embodiment, in one implementation of the second aspect, the information of the same time domain resource includes at least one of the following: a starting symbol for the terminal device to transmit the target channel in the at least one time domain resource unit, a number of symbols for transmitting the target channel in the at least one time domain resource unit, a mini-slot for transmitting the target channel in the at least one time domain resource unit and a number of mini-slots for transmitting the target channel in the at least one time domain resource unit.

In an embodiment, in one implementation of the second aspect, the information of the same time domain resource includes an identifier of the same time domain resource, and the same time domain resource is a time domain resource corresponding to the identifier among a plurality of preset time domain resources.

In an embodiment, in one implementation of the second aspect, the first frequency domain resource includes a continuous frequency domain resource or a discontinuous frequency domain resource.

In an embodiment, in one implementation of the second aspect, the same time domain resource is all time domain resources in the at least one time domain resource unit.

In an embodiment, in one implementation of the second aspect, the time domain resource unit includes any one of the following: a slot, a mini-slot and a subframe.

In an embodiment, in one implementation of the second aspect, the data channel includes any one of the following: an uplink data channel, a downlink data channel and a sidelink data channel.

In an embodiment, in one implementation of the second aspect, where the transmitting, by a network device, first resource indication information to a terminal device includes: transmitting, by the network device, the first resource indication information to the terminal device through system information or radio resource control (RRC) signaling.

A third aspect provides a terminal device, which can perform the operations of the terminal device in the above-mentioned first aspect or any optional implementation of the first aspect. Specifically, the terminal device may include a module unit configured to perform the operations of the terminal device in the above-mentioned first aspect or any possible implementation of the first aspect.

A fourth aspect provides a network device, which can perform the operation of the network device in the above-mentioned second aspect or any optional implementation of the second aspect. Specifically, the network device may include a module unit configured to perform the operations of the network device in the above-mentioned second aspect or any possible implementation of the second aspect.

A fifth aspect provides a terminal device including a processor, a transceiver, and a memory. Where the processor, the transceiver and the memory communicate with each other through an internal connection path. The memory is configured to store an instruction, and the processor is configured to execute the instruction stored in the memory. When the processor executes the instruction stored in the memory, the execution causes the terminal device to perform the method of the first aspect or any possible implementation of the first aspect, or the execution causes the terminal device to implement the terminal device according to the third aspect.

A sixth aspect provides a network device including a processor, a transceiver, and a memory. Where the processor, the transceiver and the memory communicate with each other through an internal connection path. The memory is configured to store an instruction, and the processor is configured to execute the instruction stored in the memory. When the processor executes the instruction stored in the memory, the execution causes the network device to perform the method of the second aspect or any possible implementation of the second aspect, or the execution causes the network device to implement the network device according to the fourth aspect.

A seventh aspect provides a computer readable storage medium, where the computer readable storage medium stores a program that causes a network device to perform any one of the methods for transmitting data in the above-mentioned first aspect and its various implementations.

An eighth aspect provides a computer readable storage medium, where the computer readable storage medium stores a program that causes a network device to perform any one of the methods of transmitting data in the above-mentioned second aspect and its various implementations.

A ninth aspect provides a system chip including an input interface, an output interface, a processor and a memory, where the processor is configured to execute an instruction stored in the memory, and when the instruction is executed, the processor may implement any one of the methods in the above-mentioned first aspect and its various implementations.

A tenth aspect provides a system chip including an input interface, an output interface, a processor and a memory, where the processor is configured to perform an instruction stored in the memory, and when the instruction is executed, the processor may implement any one of the methods in the above-mentioned second aspect and its various implementations.

An eleventh aspect provides a method for transmitting data, including: receiving, by a terminal device, first resource indication information transmitted by a network device, where the first resource indication information indicates a second frequency resource for transmitting a target channel in at least one time domain resource, and the target channel includes a data channel or a control channel of the terminal device; determining, by the terminal device, a first frequency resource in the at least one time domain resource unit according to the second frequency resource, a time domain resource for transmitting the target channel on a plurality of frequency resource units of the first resource domain resource is the same, and the first domain frequency resource is other frequency domain resource that can be used for channel transmission other than the first frequency domain; and receiving, by the terminal device, second resource indication information transmitted by the network device, where the second resource indication information indicates a time domain resource for transmitting the target channel on each frequency resource domain in a plurality of frequency domain resources of the second frequency domain resource in the at least one domain resource, and time domain resources for transmitting the target channel on the plurality of the frequency domains of the second frequency domain resource are at least partially different.

A twelfth aspect provides a method for transmitting data, including: determining, by a network device, a second frequency domain resource for transmitting a target channel in at least one time domain resource unit, where the target channel includes a data channel or a control channel of the terminal device; transmitting, by the network device, first resource indication information to the terminal device, where the first resource indication information is used for indicating the second frequency domain resource in the at least one time domain resource unit, so that the terminal device determines a first frequency domain resource according to the second frequency domain resource, a time domain resource for transmitting the target channel on a plurality of frequency domain resources of the first frequency domain resource is the same, and the first frequency domain resource is other frequency domain resource that can be used for channel transmission other than the second frequency domain resource; and transmitting, by the network device, second resource indication information to the terminal device, where the second resource indication information is used for indicating a time domain resource for transmitting the target channel on each frequency domain resource unit in a plurality of frequency domain units of the second domain resource in the at least one time domain resource unit, and time domain resources for transmitting the target channel on the plurality of the frequency domain units of the second frequency domain resource are at least partially different.

That is to say, as described in the first and second aspects, the network device indicates the first frequency domain resource through the first resource indication information, and the terminal device may infer the position of the second frequency domain resource according to the first frequency domain resource; or the network device may indicate the second frequency domain resource through the first resource indication information according to the eleventh and twelfth aspects, so that the terminal device can infer the position of the first frequency domain resource according to the second frequency domain resource. The methods described in the eleventh and twelfth aspects can be specifically referred to the descriptions of the first and second aspects, and will not be repeated here for the sake of brevity.

A thirteenth aspect provides a terminal device, which may perform the operations of the terminal device in the above-mentioned eleventh aspect or any optional implementation of the eleventh aspect. Specifically, the terminal device may include a module unit configured to perform the operations of the terminal device in the above-mentioned eleventh aspect or any possible implementation of the eleventh aspect.

A fourteenth aspect provides a network device, which can perform the operations of the network device in the above-mentioned twelfth aspect or any optional implementation of the twelfth aspect. Specifically, the network device may include a module configured to perform the operations of the network device in the above-mentioned twelfth aspect or any possible implementation of the twelfth aspect.

A fifteenth aspect provides a terminal device including a processor, a transceiver, and a memory. Where the processor, the transceiver and the memory communicate with each other through an internal connection path. The memory is configured to store an instruction, and the processor is configured to execute the instruction stored in the memory. When the processor executes the instruction stored in the memory, the performance causes the terminal device to perform the method of the eleventh aspect or any possible implementation of the eleventh aspect, or the performance causes the terminal device to implement the terminal device according to the thirteenth aspect.

A sixteenth aspect provides a network device including a processor, a transceiver, and a memory. Where the processor, the transceiver and the memory communicate with each other through an internal connection path. The memory is configured to store an instruction, and the processor is configured to execute the instruction stored in the memory.

When the processor executes the instructions stored in the memory, the performance causes the network device to perform the method of the twelfth aspect or any possible implementation of the twelfth aspect, or the execution causes the network device to implement the network device according to the fourteenth aspect.

A seventeenth aspect provides a computer readable storage medium, where the computer readable storage medium stores a program that causes a network device to perform any one of the methods for transmitting data in the above-mentioned eleventh aspect and its various implementations.

An eighteenth aspect provides a computer readable storage medium, where the computer readable storage medium stores a program that causes a network device to perform any one of the methods for transmitting data in the above-mentioned twelfth aspect and its various implementations.

A nineteenth aspect provides a system chip including an input interface, an output interface, a processor and a memory, where the processor is configured to execute an instruction stored in the memory, and when the instruction is execute, the processor may implement any one of the methods in the above-mentioned eleventh aspect and its various implementations.

A twentieth aspect provides a system chip including an input interface, an output interface, a processor and a memory, where the processor is configured to execute an instruction stored in the memory, and when the instruction is executed, the processor may implement any one of the methods in the above-mentioned twelfth aspect and its various implementations.

BRIEF DESCRIPTION OF THE DRAWINGS

FIG. 4 is a schematic flowchart of a method for transmitting data according to an embodiment of the present application.

FIG. 12 is a schematic flowchart of a method for transmitting data according to an embodiment of the present application.

DESCRIPTION OF EMBODIMENTS

Technical solutions in embodiments of the present application will be described below with reference to the accompanying drawings.

It should be understood that the technical solutions of the embodiments of the present application can be applied to various communication systems, for example, a global system of mobile communication (referred to as "GSM") system, a code division multiple access (referred to as "CDMA") system, a wideband code division multiple access (referred to as "WCDMA") system, a long term evolution (referred to as "LTE") system, an LTE frequency division duplex (referred to as "FDD") system, an LTE time division duplex (referred to as "TDD") system, a universal mobile telecommunication system (referred to as "UMTS"), and a future 5G communication system.

In the present application, various embodiments are described in combination with a terminal device. The terminal device may also be referred to as user equipment (referred to as "UE"), an access terminal, a subscriber unit, a subscriber station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (referred to as "SIP") phone, a wireless local loop (referred to as "WLL") station, or a personal digital assistant (referred to as "PDA"), a handheld device with wireless communication capabilities, a computing device or other processing device connected to a wireless modem, an on-board equipment, a wearable device, a terminal device in a future 5G network, or a terminal device in a future evolution public land mobile network (referred to as "PLMN") terminal equipment in the network.

In the present application, various embodiments are described in combination with a network device. The network device may be a device configured to communicate with the terminal device, for example, it may be a base transceiver station (referred to as "BTS") in the GSM system or CDMA system, or may be a NodeB (referred to as "NB") in the WCDMA system, it may also be an evolved base station (referred to as "eNB" or "eNodeB") in the LTE system, or the network device may be a relay station, an access point, an on-board equipment, a wearable device, and a network side device in the future 5G network or a network side device in the future evolution PLMN network.

Figure 1:
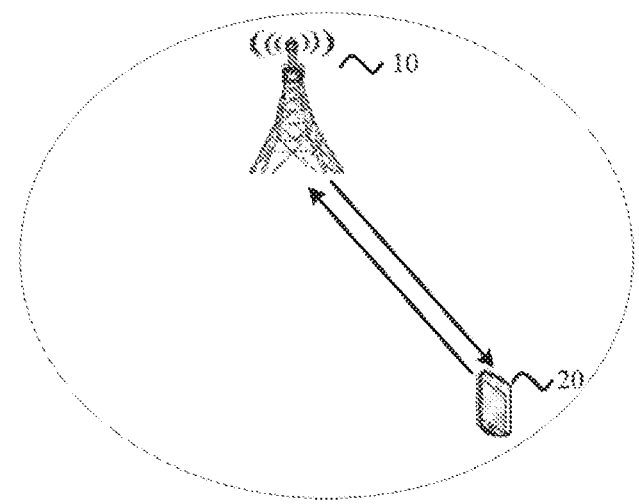
FIG. 1 is a schematic architecture diagram of an application scenario according to an embodiment of the present application.

FIG. 1 is a schematic architecture diagram of an application scenario of an embodiment of the present application. The communication system in FIG. 1 may include a network device 10 and a terminal device 20. The network device 10 is configured to provide a communication service for the terminal device 20 and enable it to access a core network, the terminal device 20 may access the network by searching for a synchronization signal, a broadcast signal and the like transmitted by the network device 10, in order to perform communication with the network. The arrow shown in FIG. 1 may indicate uplink/downlink transmission over a cellular link between the terminal device 20 and the network device 10.

The network in the embodiments of the present application may refer to a public land mobile network (referred to as "PLMN") or a device to device (referred to as "D2D") network or a machine to machine/man (referred to as "M2M") network or other networks. FIG. 1 is a merely an example of a simplified schematic diagram, and other terminal devices may also be included in the network, which are not shown in FIG. 1.

In a total system bandwidth of the current long term evolution (referred to as "LTE") system, a physical downlink control channel (referred to as "PDCCH") occupies first few symbols in a subframe for transmission, and the number of symbols occupied by the PDCCH is indicated by a physical control format indication channel (referred to as "PCFICH") in the same subframe, therefore, symbols occupied by a physical downlink shared channel (referred to as "PDCCH") in a subframe may also be derived from the information of the symbols occupied by the PDCCH indicated by the PCFICH in the same subframe, which does not need to be additionally indicated to the terminal.

However, in a 5G new radio (referred to as "NR") system, in a time domain resource unit or time domain scheduling unit such as a slot and a mini-slot, PDCCH may also exist in the first few symbols, but the specific number of the symbols used for transmitting the PDCCH may be different in each physical resource block (referred to as "PRB"). When the PDSCH is transmitted from the base station to the terminal in a certain PRB, a starting symbol for transmitting the PDSCH in the PRB may be indicated through downlink control information (referred to as "DCI"). In addition, the 5G system will support "bidirectional slot", that is, the first half of a slot may be used for downlink transmission and the second half may be used for uplink transmission, so the last few symbols of a slot may not be used for transmitting the PDSCH but for transmitting an uplink channel such as a physical uplink control channel (referred to as "PUCCH"), and the number of symbols occupied by the PUCCH in the slot may also be indicated through DCI. Therefore, in a 5G system, which symbols are used for transmitting the PDSCH in a slot may also be known through DCI.

For a physical uplink shared channel (referred to as "PUSCH"), in a LTE system, which symbols are occupied by the PUSCH in a subframe are statically determined according to a frame structure, so a resource position in the subframe of the resource allocated to the terminal by the base station for transmitting the PUSCH is completely determined, and which does not need to be indicated to the terminal. But in the 5G system, when a base station schedules a PRB for a terminal in a time domain resource unit, the PUSCH in the PRB may occupy the entire time domain resource unit, or may occupy only several symbols in the time domain resource unit while other symbols are occupied by other channels such as the PUCCH and the PDCCH. Therefore, in the 5G system, the positions of resources for transmitting the PUCCH, the PDCCH and the like are indicated through DCI.

Therefore, dynamic multiplexing of the time domain resources of the data channel and the control channel, and dynamic multiplexing of the time domain resources of the downlink channel and the uplink channel can be realized in the 5G NR system through the indication of DCI, which is beneficial to improving resource utilization and shortening a time delay. However, such resource configuration manner increases the complexity of the base station and the terminal device, and causes a large amount of unnecessary control signaling overhead.

Figure 2:
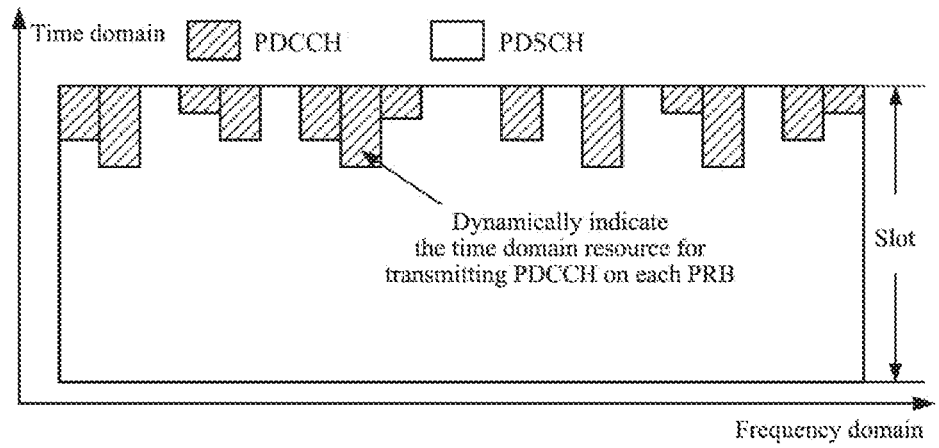
FIG. 2 is a schematic diagram of PDSCH source configuration in the prior art.

For example, in the resource configuration manner shown in FIG. 2, a length of the time domain resource for transmitting the PDCCH in each frequency domain scheduling unit such as the PRB is indicated by the base station, and it can be seen that among the multiple PRBs, the overhead of the control signaling for indicating the time domain resource for transmitting the PDCCH within each PRB is very large. However, in fact, the carrier bandwidth in the 5G system is very large, the PDCCH generally does not need to be provided on the entire bandwidth, and many frequency domain resources may only be used for transmitting the PDSCH, so it is unnecessary to indicate the time domain resource for transmitting the PDCCH in each frequency domain scheduling unit.

Figure 3:
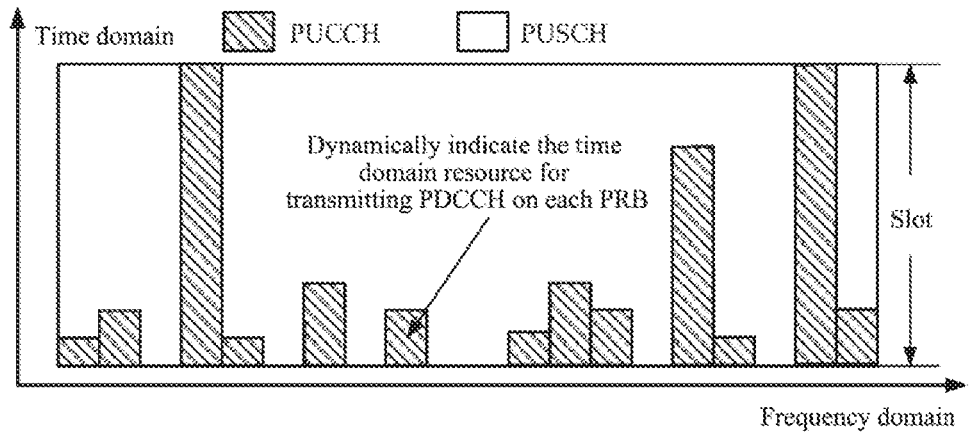
FIG. 3 is a schematic diagram of PDSCH source configuration in the prior art.

For another example, in the resource configuration manner shown in FIG. 3, the length of the time domain resource for transmitting the PUCCH in each frequency domain scheduling unit such as the PRB is indicated by the base station, and it can be seen that among the multiple PRBs, the overhead of the control signaling for indicating the time domain resource for transmitting the PUCCH within each PRB is very large. However, in fact, the carrier bandwidth in the 5G system is very large, the PUCCH does not need to be provided on the entire bandwidth, and many frequency domain resources may only be used for transmitting the PUSCH, so it is unnecessary to indicate the time domain resource for transmitting the PUCCH in each frequency domain scheduling unit.

As dynamic indication of a resource is only required in part of the frequency domain range in a system, and is not required in many resource ranges. Thus, the uniform use of the above-mentioned resource configuration manner in all frequency domain ranges will increase the complexity of the base station and the terminal device and cause a large amount of unnecessary control signaling overhead. Therefore, in the embodiments of the present application, when the network device schedules the transmission resource of the data channel, the network device allocates the time domain resources occupied by the uplink/downlink channels by adopting different resource configuration manners in different frequency domain resource ranges. Within a second frequency domain resource range, the network device respectively indicates the time domain resources for transmitting the uplink/downlink channels on each frequency domain scheduling unit to the terminal device, while within a first frequency domain resource range, the time domain resources used by the terminal device for transmitting the uplink/downlink channels on a plurality of frequency domain scheduling units are the same preset time domain resources. Therefore, it is not necessary to respectively indicate the transmission resource in each frequency domain resource unit in the entire frequency domain range, thereby reducing unnecessary control signaling overhead in the resource configuration process and reducing the complexity of the network device and the terminal device.

FIG. 4 is a schematic flowchart of a method 400 for transmitting data according to an embodiment of the present application. The method for transmitting data in FIG. 4 may be performed by a terminal device such as the terminal device 20 shown in FIG. 1. As shown in FIG. 4, the specific process of transmitting data includes:

In 410, a terminal device receives first resource indication information transmitted by a network device.

Where, the first resource indication information indicates a first frequency domain resource for transmitting a target channel in at least one time domain resource unit, a time domain resource for transmitting the target channel on a plurality of frequency domain resource units of the first frequency domain resource is the same, the target channel includes a data channel or a control channel of the terminal device.

Specifically, the terminal device receives the first resource indication information indicating the first frequency domain resource transmitted by the network device. The first frequency domain resource includes a plurality of frequency domain resource units such as physical resource blocks (PRBs), and the time domain resource for transmitting the target channel on each frequency domain resource unit in the first frequency domain resource is the same. After the terminal device determines the first frequency domain resource indicated by the first resource indication information, the time domain resource for transmitting the target channel in any one of the first frequency domain resources is the same.

It should be understood that, the first frequency domain resource may be regarding a certain time domain resource unit such as a slot, that is, the first resource indication information indicates the first frequency domain resource for transmitting the target channel on a certain slot, or may be regarding a plurality of time domain resource units such as a plurality of slots, that is, the first resource indication information indicates the first frequency domain resource for transmitting the target channel on a plurality of slots. For the sake of brevity, the first frequency domain resource is exemplified as the frequency resource for transmitting the target channel in one slot for description, but the present application is not limited thereto.

In an embodiment, the method further includes: the terminal device receives information of the same time domain resource transmitted by the network device.

That is to say, after determining the first frequency domain resource according to the first resource indication information, the terminal device determines that the time domain resource for transmitting the target channel on the plurality of frequency domain resource units of the first frequency domain resource is the same, and at the same time, the terminal device may determine on which time domain resource to transmit the target channel specifically by receiving the information of the same time domain resource transmitted by the network device.

For example, the same time domain resource may be at least one of the following: a starting symbol for the terminal device to transmit the target channel in the at least one time domain resource unit, the number of symbols for transmitting the target channel in the at least one time domain resource unit, a mini-slot for transmitting the target channel in the at least one time domain resource unit and the number of mini-slots for transmitting the target channel in the at least one time domain resource unit.

Specifically, according to the received the information of the same time domain resource, the terminal device may include a starting position and/or the number of symbols occupied by the time domain resource for transmitting the target channel in the time domain resource unit; or it may further include a starting position of mini-slots and/or the number of mini-slots occupied by the time domain resource for transmitting the target channel in a (n+i)th time domain resource unit, at this time, a time domain resource unit may include several mini-slots; if a time domain resource unit may include several mini-slots and each mini-slot may include several symbols, the information of the same time domain resource may further include information of mini-slots occupied by the time domain resource for transmitting the target channel in the time domain resource unit and information of symbols occupied in the mini-slot, which is not limited here.

For another example, the information of the same time domain resource may further include an identifier of the same time domain resource, and the same time domain resource is a time domain resource corresponding to the identifier among a plurality of preset time domain resources.

That is to say, in the first frequency domain resource of the time domain resource unit, the time domain resource for transmitting the target channel may be one of a plurality of kinds of preset time domain resource configuration, which can be specifically determined through the identifier corresponding to the time domain resource. For example, the time domain resource unit is a slot, the time domain resource corresponding to identifier 1 is 2nd-7th symbols in the slot, the time domain resource corresponding to identifier 2 is 3rd-7th symbols in the slot, and the like. If the identifier 1 is carried in the second resource indication information, the terminal device will transmit the target channel on the 2nd-7th symbols in the slot.

In an embodiment, the time domain resource unit includes any one of the following: a slot, a mini-slot and a subframe.

In an embodiment, the first frequency domain resource includes a continuous frequency domain resource or a discontinuous frequency domain resource.

In an embodiment, the same time domain resource is all time domain resources in the time domain resource unit.

In this case, in the first frequency domain resource of the time domain resource unit, the time domain resource for transmitting the target channel occupies the entire time domain resource unit, and the entire time domain resource unit is used for transmitting the target channel, and it is not used for transmitting other types of channels.

In an embodiment, that the terminal device receives first resource indication information transmitted by the network device includes: the terminal device receives the first resource indication information transmitted by the network device through system information or radio resource control (RRC) signaling.

In 420, the terminal device receives second resource indication information transmitted by the network device.

Where, the second resource indication information indicates a time domain resource for transmitting the target channel on each of a plurality of frequency domain resource units of a second frequency domain resource in the at least one time domain resource unit, and the time domain resources for transmitting the target channel on the plurality of frequency domain resource units of the second frequency domain resource are at least partially different, and the second frequency domain resource is other frequency domain resource that can be used for channel transmission other than the first frequency domain resource.

Specifically, on the frequency domain resource that can be used for channel transmission other than the first frequency domain resource, that is, the second frequency domain resource, the time domain resources for transmitting the target channel by the terminal device are different or partially different, so that the network device needs to indicate the time domain resource for transmitting the target channel on each frequency domain resource unit through the second resource indication information.

As the network device divides the first frequency domain resource and the second frequency domain resource, and adopts different resource configuration manners to allocate the time domain resources occupied by the target channel in different frequency domain resource ranges. For example, within the first frequency domain resource range, the network device respectively indicates the time domain resource for transmitting the target channel on each frequency domain resource unit to the terminal device, while within the second frequency domain resource range, the time domain resources used by the terminal device for transmitting the target channel on a plurality of frequency domain scheduling units are the same preset time domain resources. Therefore, it is not necessary to respectively indicate the target channel resource in each frequency domain resource unit according to the prior art, thereby reducing unnecessary control signaling overhead in the resource configuration process and reducing the complexity of the network device and the terminal device.

In an embodiment, after 420, the method may further include 430.

In 430, the terminal device transmits the target channel to the network device or receives the target channel transmitted by the network device by using the same time domain resource on the plurality of frequency domain resource units of the first frequency domain resource, and transmits the target channel to the network device or receives the target channel transmitted by the network device by using the time domain resource unit indicated by the second resource indication information on the plurality of frequency domain resource units of the second frequency domain resource.

The above method may be applied to scenarios of uplink and downlink transmission, where the target channel may be a data channel or a control channel, and the data channel may be an uplink data channel, a downlink data channel, or a sidelink data channel.

It should be understood that, in the embodiments of the present application, the network device may indicate the first frequency domain resource through the first resource indication information, and the terminal device may infer the position of the second frequency domain resource according to the first frequency domain resource; or the network device may indicate the second frequency domain resource through the first resource indication information, so that the terminal device can infer the position of the first frequency domain resource according to the second frequency domain resource, which is not limited here, as long as the indication of the network device enables the terminal device to know the first frequency domain resource and the second frequency domain resource.

In the embodiments of the present application, when the network device schedules the transmission resource of the data channel, the network device allocates the time domain resources occupied by the uplink/downlink channels by adopting different resource configuration manners in different frequency domain resource ranges. For example, within the first frequency domain resource range, the network device respectively indicates the time domain resource for transmitting the uplink/downlink channels on each frequency domain scheduling unit to the terminal device, while within the second frequency domain resource range, the time domain resources used by the terminal device for transmitting the uplink/downlink channels on the plurality of frequency domain scheduling units are the same preset time domain resources. Therefore, respective indications are not required, thereby reducing unnecessary control signaling overhead in the resource configuration process and reducing the complexity of the network device and the terminal device.

The method for transmitting data according to an embodiment of the present application will be described in detail below with examples in FIG. 5 to FIG. 10. In FIGS. 5 to 10, the target channel is exemplified as a data channel.

Figure 5:
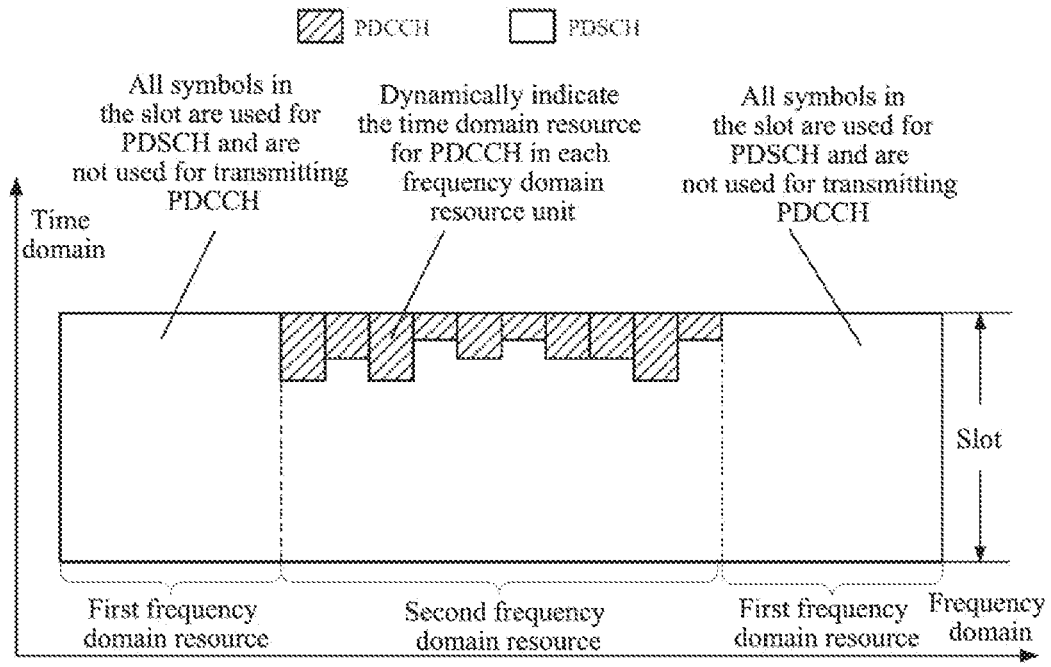
FIG. 5 is a schematic diagram of resource configuration of PDSCH according to an embodiment of the present application.

For example, a schematic diagram of resource configuration of PDSCH is shown in FIG. 5. The network device takes frequency domain resources on both sides of a carrier bandwidth as a downlink reserved resource, that is, the first frequency domain resource, and in the first frequency domain resource, all symbols in a slot are used for transmitting the PDSCH, and they are not used for transmitting the PDCCH. The network device may indicate the first frequency domain resource to the terminal device through system information or RRC signaling, so that the terminal device only receives the PDSCH transmitted by the network device on the plurality of frequency domain resource units of the first frequency domain resource. While on each frequency domain resource unit of the second frequency domain resource, the terminal device receives the PDSCH transmitted by the network device by using the time domain resource unit indicated by the second resource indication information.

Figure 6:
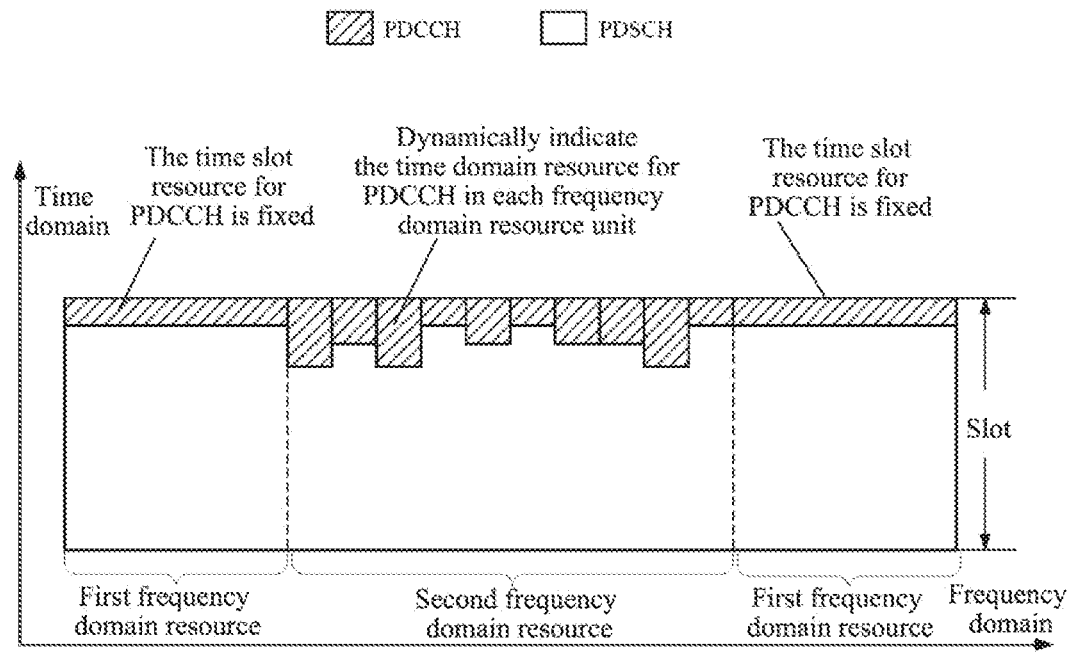
FIG. 6 is a schematic diagram of resource configuration of PDSCH according to an embodiment of the present application.

For another example, a schematic diagram of resource configuration of PDSCH is shown in FIG. 6. The network device takes the frequency domain resources on both sides of the carrier bandwidth as the downlink reserved resource, that is, the first frequency domain resource. In the first frequency domain resource, the number of symbols for transmitting the PDCCH in a slot is fixed, so that the number of symbols for transmitting the PDSCH in that slot is also fixed. The network device may indicate the first frequency domain resource to the terminal device through system information or RRC signaling, so that the terminal device receives the PDCCH transmitted by the network device by using a fixed time domain resource on the plurality of frequency domain resource units of the first frequency domain resource and receives the PDSCH transmitted by the network device by using a fixed time domain resource on the plurality of frequency domain resource units of the first frequency domain resource. While on each frequency domain resource unit of the second frequency domain resource, the terminal device receives the PDSCH transmitted by the network device by using the time domain resource unit indicated by the second resource indication information.

Figure 7:
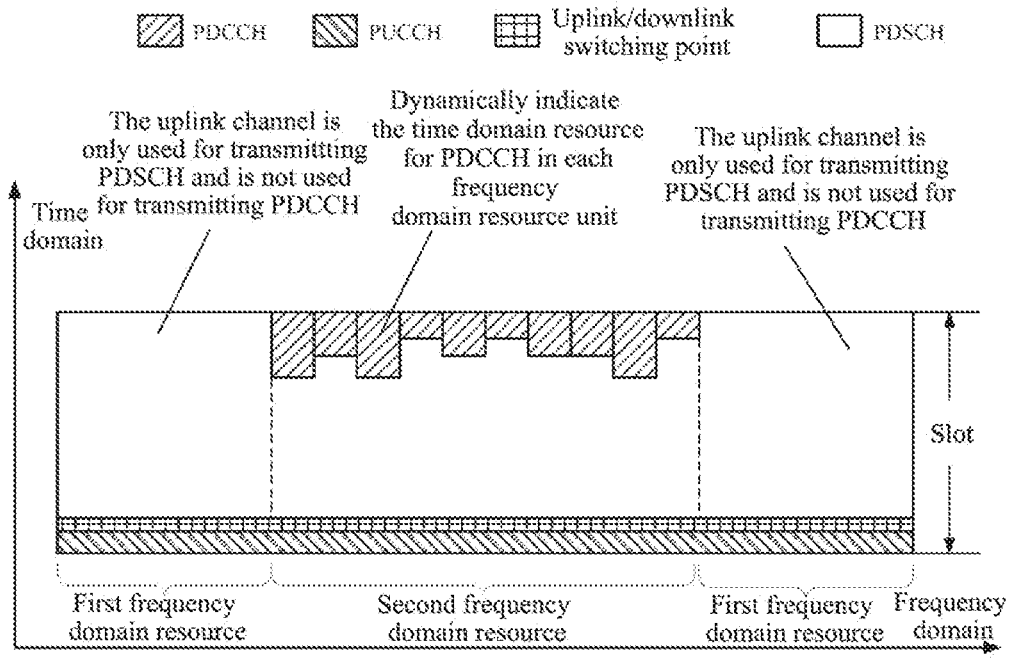
FIG. 7 is a schematic diagram of resource configuration of PDSCH according to an embodiment of the present application.

For another example, a schematic diagram of resource configuration of PDSCH is shown in FIG. 7. The network device takes the frequency domain resources on both sides of the carrier bandwidth as the downlink reserved resource, that is, the first frequency domain resource. In the first frequency domain resource, a fixed number of symbols in a slot whose positions are fixed are used for uplink transmission, for example, for transmitting the PUCCH, and all of the rest symbols in the slot are used for transmitting the PDSCH. The network device indicates the first frequency domain resource to the terminal device, so that the terminal device receives the PDSCH transmitted by the network device by using the fixed time domain resource on the plurality of frequency domain resource units of the first frequency domain resource and transmits the PUCCH to the network device by using the fixed time domain resource on the plurality of frequency domain resource units of the first frequency domain resource. While on each frequency domain resource unit of the second frequency domain resource, the terminal device receives the PDSCH transmitted by the network device by using the time domain resource unit indicated by the second resource indication information.

Figure 8:
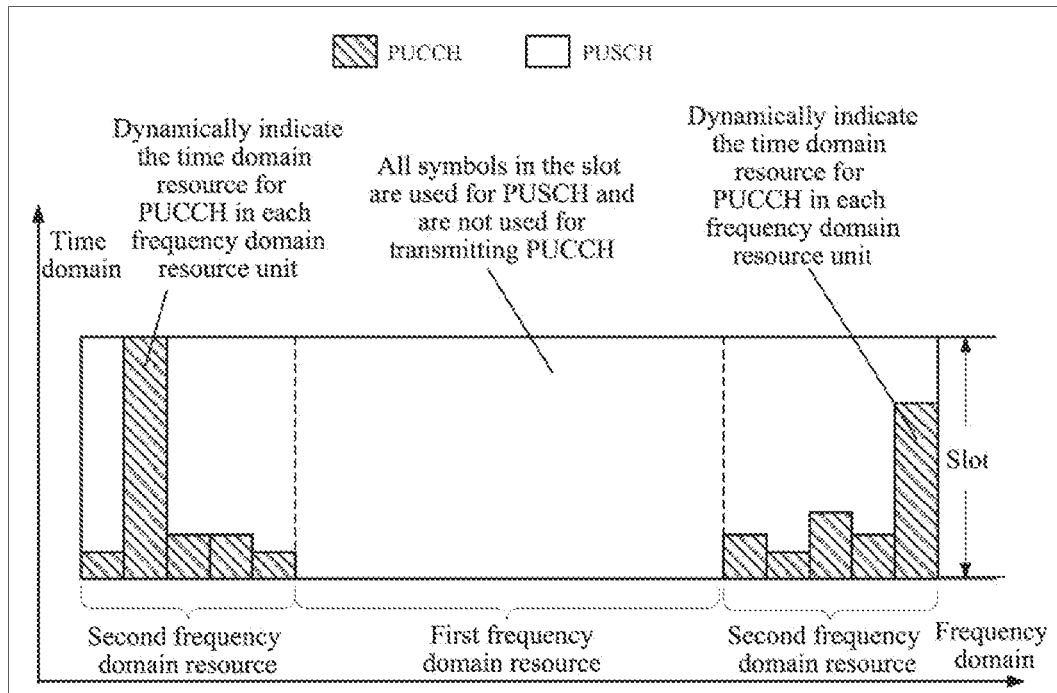
FIG. 8 is a schematic diagram of resource configuration of PDSCH according to an embodiment of the present application.

For another example, a schematic diagram of resource configuration of PUSCH is shown in FIG. 8. The network device takes a frequency domain resource in a center of the carrier bandwidth as the uplink reserved resource, that is, the first frequency domain resource, and in the first frequency domain resource, all symbols of a slot are used for transmitting the PUSCH and are not used for transmitting the PUCCH. The network device may indicate the first frequency domain resource to the terminal device through system information or RRC signaling, so that the terminal device only transmits the PUSCH to the network device on the plurality of frequency domain resource units of the first frequency domain resource. While on each frequency domain resource unit of the second frequency domain resource, the terminal device transmits the PUSCH to the network device by using the time domain resource unit indicated by the second resource indication information.

Figure 9:
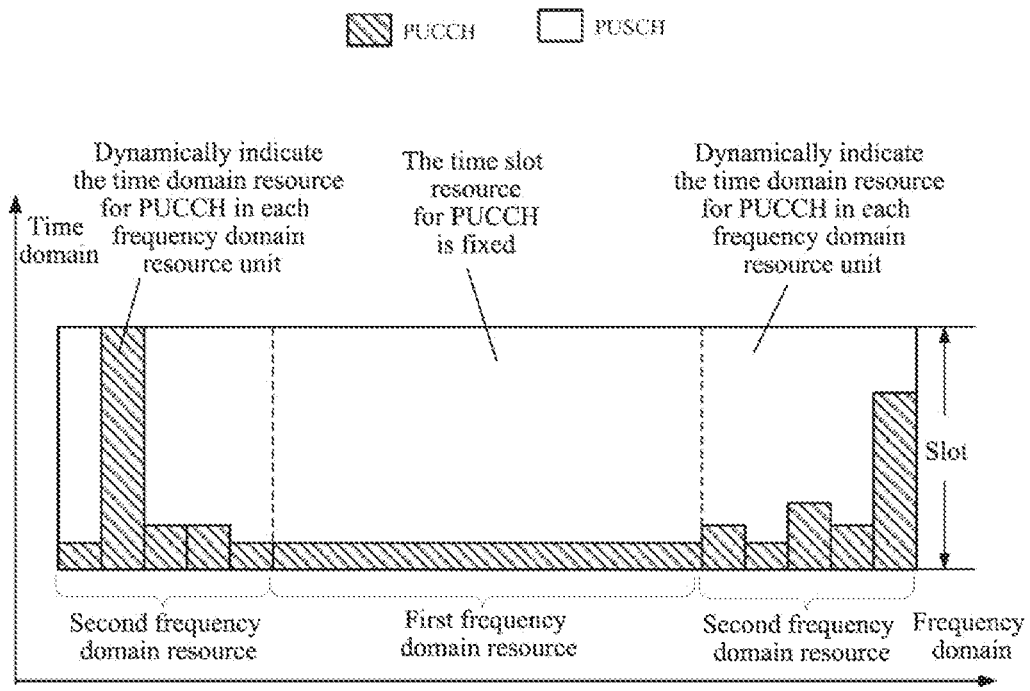
FIG. 9 is a schematic diagram of resource configuration of PDSCH according to an embodiment of the present application.

For another example, a schematic diagram of resource configuration of PUSCH is shown in FIG. 9. The network device takes the frequency domain resource in the center of the carrier bandwidth as the uplink reserved resource, that is, the first frequency domain resource. In the first frequency domain resource, the number and positions of symbols for transmitting the PUCCH in a slot are fixed, so that the number of symbols for transmitting the PUSCH in the slot is also fixed. The network device may indicate the first frequency domain resource to the terminal device through system information or RRC signaling, so that the terminal device transmits the PUCCH to the network device by using a fixed time domain resource and transmits the PUSCH to the network device by using a fixed time domain resource on the plurality of frequency domain resource units of the first frequency domain resource. While on each frequency domain resource unit of the second frequency domain resource, the terminal device transmits the PUSCH to the network device by using the time domain resource unit indicated by the second resource indication information.

Figure 10:
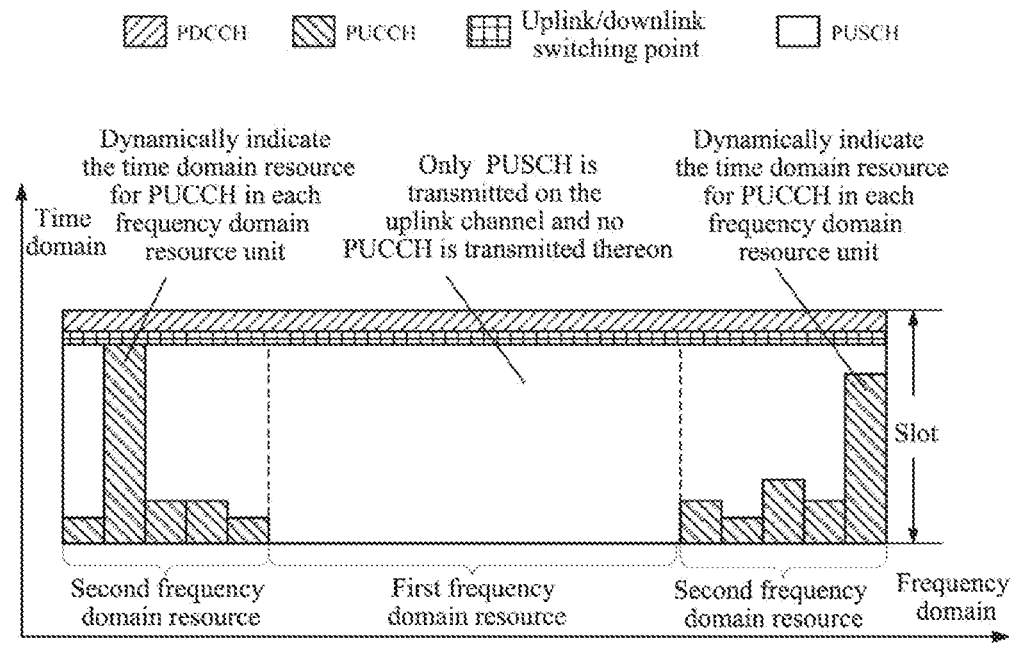
FIG. 10 is a schematic diagram of resource configuration of PDSCH according to an embodiment of the present application.

For another example, a schematic diagram of resource configuration of PUSCH is shown in FIG. 10. The network device takes the frequency domain resource in the center of the carrier bandwidth as the uplink reserved resource, that is, the first frequency domain resource. In the first frequency domain resource, a fixed number of symbols in a slot whose positions are fixed are used for downlink transmission, for example, for transmitting the PDCCH, and all of the rest symbols in the slot are used for transmitting the PUSCH. The network device indicates the first frequency domain resource to the terminal device, so that the terminal device receives the PDCCH transmitted by the network device by using the fixed time domain resource and transmits the PUSCH to the network device by using the fixed time domain resource on a plurality of frequency domain resource units of the first frequency domain resource. While on each frequency domain resource unit of the second frequency domain resource, the terminal device transmits the PUSCH to the network device by using the time domain resource unit indicated by the second resource indication information.

It is described in above FIG. 5 to FIG. 10 that the first resource indication information transmitted by the network device indicates the first frequency domain resource, but the network device may also indicate the second frequency domain resource through the first resource indication information, so that the terminal device may infer the position of the first frequency domain resource from the second frequency domain resource.

Figure 11:
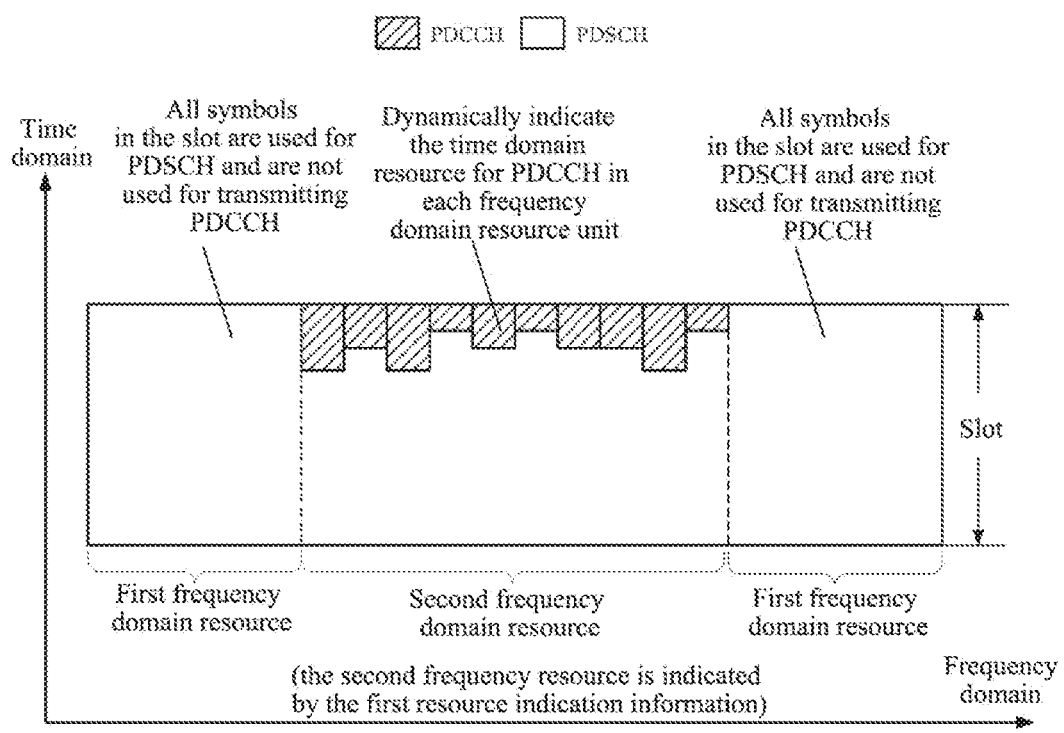
FIG. 11 is a schematic diagram of resource configuration of PDSCH according to an embodiment of the present application.

For example, a schematic diagram of resource configuration of PDSCH is shown in FIG. 11. The network device takes the frequency domain resources on both sides of the carrier bandwidth as the downlink reserved resource, that is, the first frequency domain resource, and in the first frequency domain resource, all symbols in the slot are used for transmitting the PDSCH, and they are not used for transmitting the PDCCH. The network device can indicate the second frequency domain resource to the terminal device through system information or RRC signaling. The terminal device can infer the position of the first frequency domain resource according to the second frequency domain resource, so that only the PDSCH transmitted by the network device is received on the plurality of frequency domain resource units of the first frequency domain resource, while on the second frequency domain resource, the data channel is transmitted according to the indication information transmitted by the network device for indicating the time domain resource of the transmission data channel on each PRB. While on each frequency domain resource unit of the second frequency domain resource, the terminal device receives the PDSCH transmitted by the network device by using the time domain resource unit indicated by the second resource indication information.

FIG. 12 is a schematic flowchart of a method 1200 for transmitting data according to an embodiment of the present application. The method of transmitting data in FIG. 4 may be performed by a network device such as the network device 10 shown in FIG. 1. As shown in FIG. 12, the specific process of transmitting data includes:

In 1210, a network device determines a first frequency domain resource for transmitting a target channel in at least one time domain resource unit among frequency domain resources that can be used for channel transmission.

Where, the time domain resource for transmitting the target channel on a plurality of frequency domain resource units of the first frequency domain resource is the same, and the target channel includes a data channel or a control channel of a terminal device.

In 1220, the network device transmits first resource indication information to the terminal device.

Where, the first resource indication information is used for indicating the first frequency domain resource in the at least one time domain resource unit.

Specifically, the network device transmits the first resource indication information indicating the first frequency domain resource to the terminal device. The first frequency domain resource includes a plurality of frequency domain resource units such as Physical Resource Blocks (PRBs), and the time domain resource for transmitting the target channel on each frequency domain resource unit in the first frequency domain resource unit is the same. After the network device determines the first frequency domain resource indicated by the first resource indication information, the time domain resource for transmitting the data channel in any one frequency domain resource unit of the first frequency domain resource is the same.

It should be understood that, the first frequency domain resource may be regarding a certain time domain resource unit such as a slot, that is, the first resource indication information indicates the first frequency domain resource for transmitting a data channel on a certain slot, or the first frequency domain resource may be regarding a plurality of time domain resource units such as a plurality of slots, that is, the first resource indication information indicates the first frequency domain resource for transmitting a data channel on a plurality of slots. For the sake of brevity, the first frequency domain resource is exemplified as the frequency resource for transmitting the data channel in one slot for description, but the present application is not limited thereto.

In an embodiment, the method further includes: the network device transmits the information of the same time domain resource to the terminal device.

In an embodiment, the same time domain resource may be at least one of the following: a starting symbol for the terminal device to transmit the target channel in the at least one time domain resource unit, the number of symbols for transmitting the target channel in the at least one time domain resource unit, a mini-slot for transmitting the target channel in the at least one time domain resource unit and the number of mini-slots for transmitting the target channel in the at least one time domain resource unit.

In an embodiment, the information of the same time domain resource further includes an identifier of the same time domain resource, and the same time domain resource is a time domain resource corresponding to the identifier among a plurality of preset time domain resources.

That is to say, in the first frequency domain resource of the time domain resource unit, the time domain resource for transmitting the data channel may be one of a plurality of kinds of preset time domain resource configuration, which can be specifically determined by the identifier corresponding to the time domain resource.

In an embodiment, the time domain resource unit includes any one of the following: a slot, a mini-slot and a subframe.

In an embodiment, the first frequency domain resource includes a continuous frequency domain resource or a discontinuous frequency domain resource.

In an embodiment, the same time domain resource is all time domain resources in the time domain resource unit.

In this case, in the first frequency domain resource of the time domain resource unit, the time domain resource for transmitting the data channel occupies the entire time domain resource unit, and the entire time domain resource unit is used for transmitting the data channel, and it is not used for transmitting other types of channels.

In an embodiment, that the network device transmits first resource indication information to the terminal device includes:

the network device transmits the first resource indication information to the terminal device through system information or radio resource control (RRC) signaling.

In 1230, the network device transmits second resource indication information to the terminal device.

Where, the second resource indication information indicates a time domain resource for transmitting the target channel on each of a plurality of frequency domain resource units of the second frequency domain resource in the at least one time domain resource unit, and the time domain resources for transmitting the target channel on the plurality of frequency domain resource units of the second frequency domain resource are at least partially different, and the second frequency domain resource is other frequency domain resource that can be used for channel transmission other than the first frequency domain resource.

Specifically, on the frequency domain resource that can be used for channel transmission other than the first frequency domain resource, that is, the second frequency domain resource, the time domain resources for transmitting the target channel by the terminal device are different or partially different, so that the network device needs to indicate the time domain resource for transmitting the target channel on each frequency domain resource unit through the second resource indication information.

As the network device divides the first frequency domain resource and the second frequency domain resource, and adopts different resource configuration manners to allocate the time domain resources occupied by the target channel in different frequency domain resource ranges. For example, within the first frequency domain resource range, the network device respectively indicates the time domain resource for transmitting the target channel on each frequency domain resource unit to the terminal device, while within the second frequency domain resource range, the time domain resources used by the terminal device for transmitting a target channel on a plurality of frequency domain scheduling units are the same preset time domain resources. Therefore, it is not necessary to respectively indicate the target channel resource in each frequency domain resource unit according to the prior art, thereby reducing unnecessary control signaling overhead in the resource configuration process and reducing the complexity of the network device and the terminal device.

In an embodiment, after 1230, the method may further include 1240.

In 1240, the network device transmits the target channel to the terminal device or receives the target channel transmitted by the terminal device by using the same time domain resource on the plurality of frequency domain resource units of the first frequency domain resource, and transmits the target channel to the terminal device or receives the target channel transmitted by the terminal device by using the time domain resource unit indicated by the second resource indication information on the plurality of frequency domain resource units of the second frequency domain resource.

The above method may be applied to scenarios of uplink and downlink transmission, where the target channel may be a data channel or a control channel, and the data channel may be an uplink data channel, a downlink data channel, or a sidelink data channel.

It should be understood that, in the embodiments of the present application, the network device may indicate the first frequency domain resource through the first resource indication information, and the terminal device may infer the position of the second frequency domain resource according to the first frequency domain resource; or the network device may indicate the second frequency domain resource through the first resource indication information, so that the terminal device can infer the position of the first frequency domain resource according to the second frequency domain resource, which is not limited here, as long as the indication of the network device enables the terminal device to know the first frequency domain resource and the second frequency domain resource.

It should also be understood that, the case where the network device configures transmission resources for the terminal device through the first resource indication information and the second resource indication information may refer to the description of FIG. 5 to FIG. 11 described above, and will not be repeated here for the sake of brevity.

Figure 13:
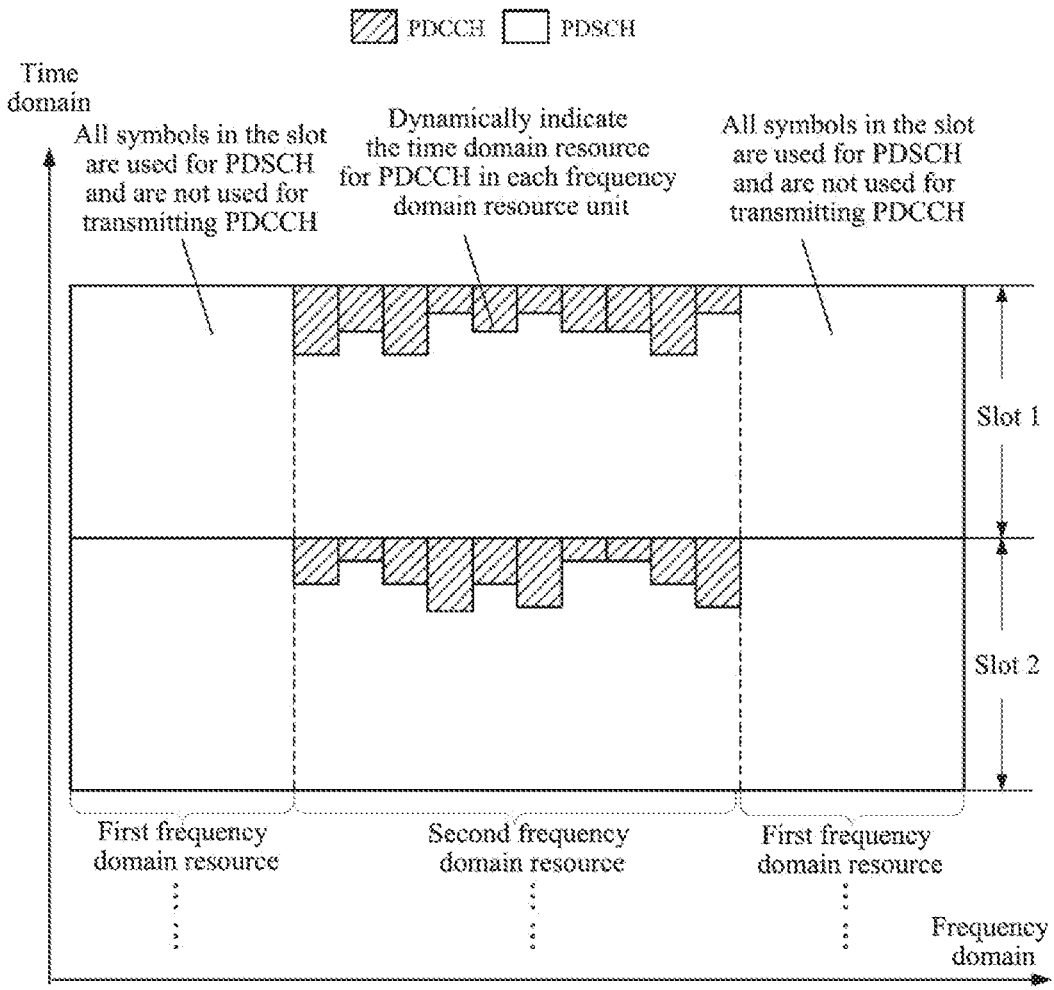
FIG. 13 is a schematic diagram of PDSCH multi-slot resource configuration according to an embodiment of the present application.

It should also be understood that, in the embodiments of the present application, the network device may indicate a reserved frequency domain resource range of a plurality of slots through the first resource indication information, that is, the first frequency domain resource. For example, a schematic diagram of resource configuration of PDSCH is shown in FIG. 13. In a plurality of slots, the network device takes the frequency domain resources on both sides of the carrier bandwidth as the downlink reserved resource, that is, the first frequency domain resource, and in the first frequency domain resource, all symbols are used for transmitting the PDSCH and are not used for transmitting the PDCCH in the plurality of slots. The network device may indicate the first frequency domain resource in the plurality of slots to the terminal device through system information or RRC signaling, so that the terminal device only receives the PDSCH transmitted by the network device on the plurality of frequency domain resource units of the first frequency domain resource in these slots. While on each frequency domain resource unit of the second frequency domain resource in these slots, the terminal device receives the PDSCH transmitted by the network device by using the time domain resource unit indicated by the second resource indication information.

It should be understood that, in various embodiments of the present application, the size of the sequence numbers of the above processes does not mean the order of performance, the order of performance of the various processes should be determined by their functions and internal logic, and should not be construed as limiting the implementation process of the embodiments of the present application.

Figure 14:
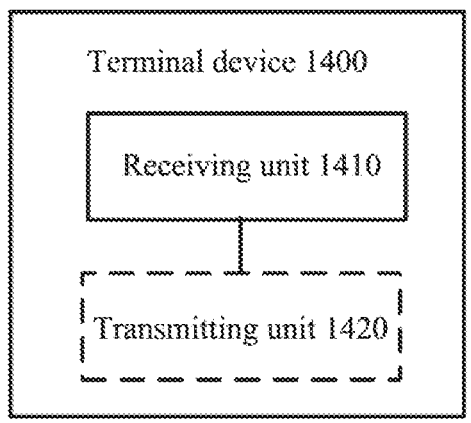
FIG. 14 is a schematic block diagram of a terminal device according to an embodiment of the present application.

FIG. 14 is a schematic block diagram of a terminal device 1400 according to an embodiment of the present application. As shown in FIG. 14, the terminal device 1400 includes a receiving unit 1410 and a transmitting unit 1420. Where:

the receiving unit 1410 is configured to: receive first resource indication information transmitted by a network device, where the first resource indication information indicates a first frequency domain resource for transmitting a target channel in at least one time domain resource unit, a time domain resource for transmitting the target channel on a plurality of frequency domain resource units of the first frequency domain resource is the same, and the target channel includes a data channel or a control channel of the terminal device; and receive second resource indication information transmitted by a network device, where the second resource indication information indicates a time domain resource for transmitting the target channel on each of a plurality of frequency domain resource units of the second frequency domain resource in the at least one time domain resource unit, time domain resources for transmitting the target channel on a plurality of frequency domain resource units of the second frequency domain resource are at least partially different, and the second frequency domain resource is a frequency domain resource that can be used for channel transmission other than the first frequency domain resource.

In an embodiment, the transmitting unit 1420 is configured to: transmit the target channel to the network device by using the same time domain resource on a plurality of frequency domain resource units of the first frequency domain resource, and transmit the target channel to the network device by using a time domain resource unit indicated by the second resource indication information on a plurality of frequency domain resource units of the second frequency domain resource; and the receiving unit 1410 is further configured to: receive the target channel transmitted by the network device by using the same time domain resource on the plurality of frequency domain resource units of the first frequency domain resource, and receive the target channel transmitted by the network device by using the time domain resource unit indicated by the second resource indication information on a plurality of frequency domain resource units of the second frequency domain resource.

Therefore, the terminal device receives, only in part of the frequency domain resources, indication information transmitted by the network device for respectively indicating the time domain resource for transmitting the uplink/downlink channels on each frequency domain scheduling unit, while in other part of the frequency domain resource range, the time domain resources used by the terminal device for transmitting the uplink/downlink channels on a plurality of frequency domain scheduling units are the same preset time domain resources. Therefore, the terminal device does not need to respectively receive the indication of the transmission resource in each frequency domain resource unit transmitted by the network device in the entire frequency domain range, thereby reducing unnecessary control signaling overhead in the resource configuration process and reducing the complexity of the terminal device.

In an embodiment, the receiving unit 1410 is further configured to: receive the information of the same time domain resource transmitted by the network device by the terminal device.

In an embodiment, the information of the same time domain resource includes at least one of the following: a starting symbol for the terminal device to transmit the data channel in the at least one time domain resource unit, a number of symbols for transmitting the data channel in the at least one time domain resource unit, a mini-slot for transmitting the data channel in the at least one time domain resource unit and a number of mini-slots for transmitting the data channel in the at least one time domain resource unit.

In an embodiment, the information of the same time domain resource includes an identifier of the same time domain resource, and the same time domain resource is a time domain resource corresponding to the identifier among a plurality of preset time domain resources.

In an embodiment, the first frequency domain resource includes a continuous frequency domain resource or a discontinuous frequency domain resource.

In an embodiment, the same time domain resource is all time domain resources in the at least one time domain resource unit.

In an embodiment, the time domain resource unit includes any one of the following: a slot, a mini-slot and a subframe.

In an embodiment, the data channel includes any one of the following: an uplink data channel, a downlink data channel and a sidelink data channel.

In an embodiment, the receiving unit 1410 is specifically configured to: receive the first resource indication information transmitted by the network device through system information or radio resource control (RRC) signaling.

Figure 15:
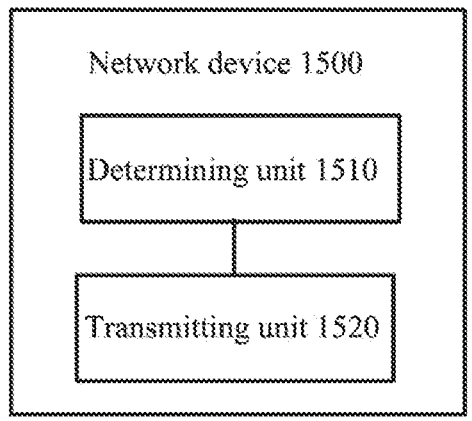
FIG. 15 is a schematic block diagram of a network device according to an embodiment of the present application.

FIG. 15 is a schematic block diagram of a network device 1500 according to an embodiment of the present application. As shown in FIG. 15, the network device 1500 includes a determining unit 1510 and a transmitting unit 1520. Where:

the determining unit 1510 is configured to: determine a first frequency domain resource for transmitting a target channel in at least one time domain resource unit among the frequency domain resources that can be used for transmitting a data channel, where a time domain resource for transmitting the target channel on a plurality of frequency domain resource units of the first frequency domain resource is the same, the target channel includes a data channel or a control channel of the terminal device;

the transmitting unit 1520 is configured to: transmit first resource indication information to the terminal device, where the first resource indication information is used for indicating a first frequency domain resource in the at least one time domain resource unit; and the transmitting unit 1520 is further configured to: transmit second resource indication information to the terminal device, where the second resource indication information is used for indicating a time domain resource for transmitting the target channel on each of the plurality of frequency domain resource units of the second frequency domain resource in the at least one time domain resource unit, time domain resources for transmitting the target channel on a plurality of frequency domain resource units of the second frequency domain resource are at least partially different, and the second frequency domain resource is the frequency domain resource that can be used for channel transmission other than the first frequency domain resource.

Therefore, the network device respectively indicates, only in part of the frequency domain resources, time domain resources for transmitting the uplink/downlink channels on each frequency domain scheduling unit to the terminal device, while in other part of the frequency domain resource range, the time domain resource used by the terminal device for transmitting the uplink/downlink channels on the plurality of frequency domain scheduling units is the same preset time domain resources. Therefore, the network device does not need to respectively indicate the transmission resource in each frequency domain resource unit in the entire frequency domain range, thereby reducing unnecessary control signaling overhead in the resource configuration process and reducing the complexity of the network device.

In an embodiment, the terminal device further includes a transmitting unit 1520 configured to: transmit the target channel to the network device by using the same time domain resource on the plurality of frequency domain resource units of the first frequency domain resource, and transmit the target channel to the network device by using the time domain resource unit indicated by the second resource indication information on a plurality of frequency domain resource units of the second frequency domain resource;

the receiving unit is further configured to: receive the target channel transmitted by the network device by using the same time domain resource on the plurality of frequency domain resource units of the first frequency domain resource, and receive the target channel transmitted by the network device by using the time domain resource unit indicated by the second resource indication information on the plurality of frequency domain resource units of the second frequency domain resource.

In an embodiment, the receiving unit is further configured to: receive the information of the same time domain resource transmitted by the network device by the terminal device.

In an embodiment, the information of the same time domain resource includes at least one of the following: a starting symbol for the terminal device to transmit the data channel in the at least one time domain resource unit, the number of symbols for transmitting the data channel in the at least one time domain resource unit, a mini-slot for transmitting the data channel in the at least one time domain resource unit and the number of mini-slots for transmitting the data channel in the at least one time domain resource unit.

In an embodiment, the information of the same time domain resource includes an identifier of the same time domain resource, and the same time domain resource is a time domain resource corresponding to the identifier among a plurality of preset time domain resources.

In an embodiment, the first frequency domain resource includes a continuous frequency domain resource or a discontinuous frequency domain resource.

In an embodiment, the same time domain resource is all time domain resources in the at least one time domain resource unit.

In an embodiment, the time domain resource unit includes any one of the following: a slot, a mini-slot and a subframe.

In an embodiment, the data channel includes any one of the following: an uplink data channel, a downlink data channel and a sidelink data channel.

In an embodiment, the receiving unit is specifically configured to: receive the first resource indication information transmitted by the network device through system information or radio resource control (RRC) signaling.

Figure 16:
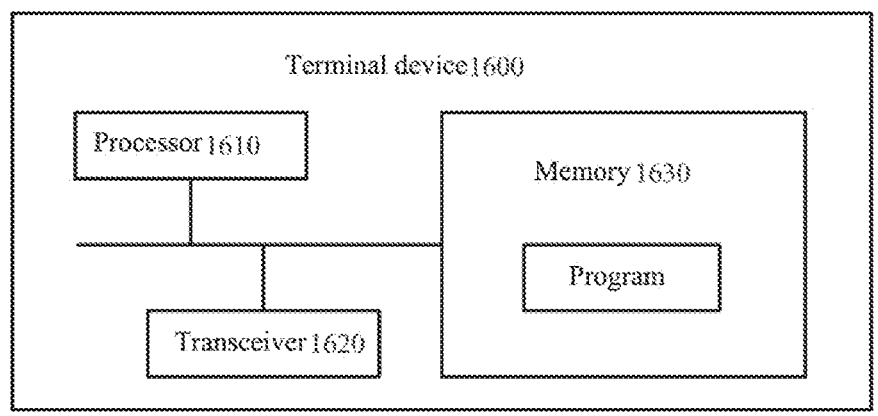
FIG. 16 is a schematic structural diagram of a terminal device according to an embodiment of the present application.

FIG. 16 is a schematic structural diagram of a terminal device 1600 according to an embodiment of the present application. As shown in FIG. 16, the terminal device includes a processor 1610, a transceiver 1620 and a memory 1630, where the processor 1610, the transceiver 1620 and the memory 1630 communicate with each other through an internal connection path. The memory 1630 is configured to store an instruction, and the processor 1610 is configured to execute the instruction stored in the memory 1630 to control the transceiver 1620 to receive a signal or transmit a signal.

In an embodiment, the processor 1610 may invoke program code stored in the memory 1630 to perform corresponding operations of the terminal device in the method 600 shown in FIG. 6, which will not be repeated here for the sake of brevity.

It should be understood that, in this embodiment of the present application, the processor 1610 may be a central processing unit (referred to as "CPU"), and the processor 1610 may also be other general purpose processor, a digital signal processor (DSP), an application specific integrated circuit (ASIC), a field programmable gate array (FPGA) or other programmable logic device, a discrete gate or a transistor logic device, a discrete hardware component and the like. The general purpose processor may be a microprocessor or the processor may be any conventional processor or the like.

The memory 1630 may include a read only memory and a random access memory and provide an instruction and data to the processor 1610. A portion of the memory 1630 may also include a non-volatile random access memory. For example, the memory 1630 may also store device type information.

In the implementation process, each step of the above method may be completed by an integrated logic circuit of hardware or an instruction in the form of software in the processor 1610. The steps of the positioning method disclosed in combination with the embodiments of the present application may be directly implemented by the hardware processor, or may be performed by a combination of hardware and software modules in the processor 1610. The software module may be located in a storage medium mature in the art such as a random access memory, a flash memory, a read only memory, a programmable read only memory or an electrically erasable programmable memory, a register, and the like. The storage medium is located in the memory 1630, and the processor 1610 reads the information in the memory 1630 and completes the steps of the above methods in combination with its hardware, which will not be described here in detail here to avoid repetition.

The terminal device 1600 according to the embodiments of the present application may correspond to the terminal device for performing the method 400, and the terminal device 1400 according to the embodiment of the application, and each unit or module in the terminal device 1600 is respectively configured to perform each action or process performed by the terminal device in the above method 400, of which the detailed description is omitted here to avoid redundancy.

Figure 17:
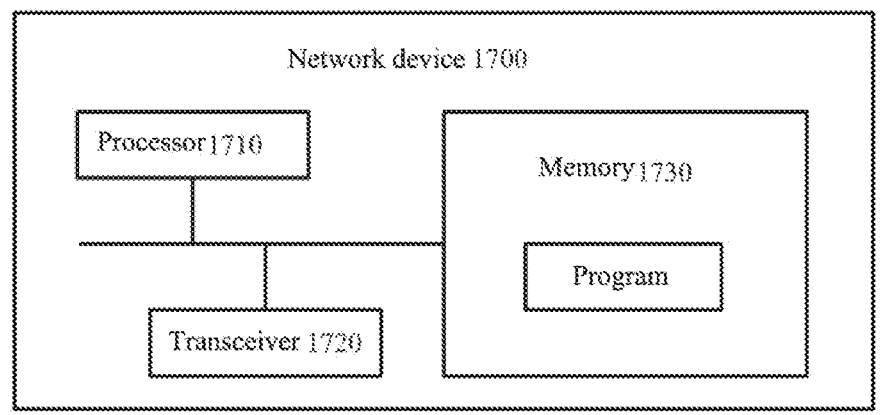
FIG. 17 is a schematic structural diagram of a network device according to an embodiment of the present application.

FIG. 17 is a schematic structural diagram of a terminal device 1700 according to an embodiment of the present application. As shown in FIG. 17, the network device includes a processor 1710, a transceiver 1720 and a memory 1730, where the processor 1710, the transceiver 1720 and the memory 1730 communicate with each other through an internal connection path. The memory 1730 is configured to store an instruction, and the processor 1710 is configured to execute the instruction stored in the memory 1730 to control the transceiver 1720 to receive a signal or transmit a signal.

In an embodiment, the processor 1710 may invoke program code stored in the memory 1730 to perform corresponding operations of the terminal device in the method 1100 shown in FIG. 11, which will not be repeated here for the sake of brevity.

It should be understood that, in this embodiment of the present application, the processor 1710 may be a central processing unit (CPU), and the processor 1710 may also be other general purpose processor, a digital signal processor (DSP), an application specific integrated circuit (ASIC), a field programmable gate array (FPGA) or other programmable logic device, a discrete gate or transistor logic device, a discrete hardware components and the like. The general purpose processor may be a microprocessor or the processor may be any conventional processor or the like.

The memory 1730 may include a read only memory and a random access memory and provide an instruction and data to the processor 1710. A portion of the memory 1730 may also include a non-volatile random access memory. For example, the memory 1730 may also store device type information.

In the implementation process, each step of the above methods may be completed by an integrated logic circuit of hardware or an instruction in the form of software in the processor 1710. The steps of the positioning method disclosed in combination with the embodiments of the present application may be directly implemented by the hardware processor, or may be performed by a combination of hardware and software modules in the processor 1710. The software module may be located in a storage medium mature in the art such as a random access memory, a flash memory, a read only memory, a programmable read only memory or an electrically erasable programmable memory, a register, and the like. The storage medium is located in the memory 1730, and the processor 1710 reads the information in the memory 1730 and completes the steps of the above methods in combination with its hardware, which will not be described here in detail to avoid repetition.

The network device 1700 according to the embodiments of the present application may correspond to the network device for performing the method 1200, and correspond to the network device 1500 according to the embodiments of the present application, and each unit or module in the network device 1700 is respectively configured to perform each operation or processing procedure performed by the network device in the above method 1200, of which the detailed description will be omitted herein to avoid repetition.

Figure 18:
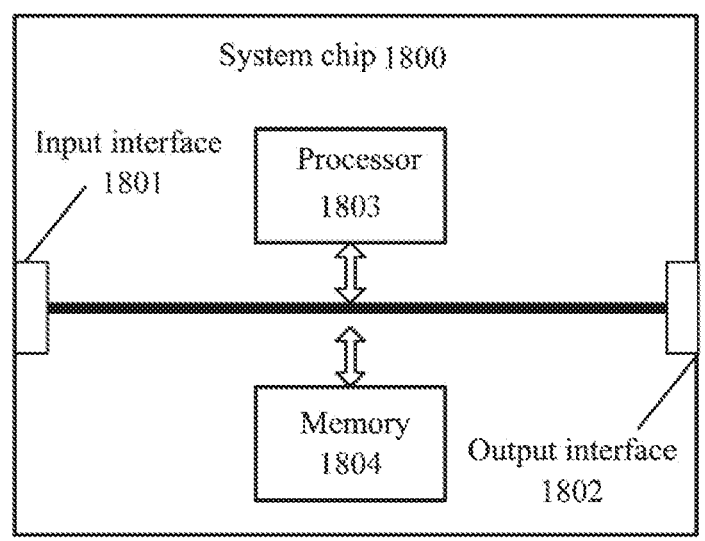
FIG. 18 is a schematic structural diagram of a system chip according to an embodiment of the present application.

FIG. 18 is a schematic structural diagram of a system chip according to an embodiment of the present application. The system chip 1800 of FIG. 18 includes an input interface 1801, an output interface 1802, at least one processor 1803, and a memory 1804. The input interface 1801, the output interface 1802, the processor 1803, and the memory 1804 are interconnected through an internal connection path. The processor 1803 is configured to execute code in the memory 1804.

In an embodiment, when the code is executed, the processor 1803 may implement the method 400 performed by the terminal device in the method embodiments, which will not be repeated herein for brevity.

In an embodiment, when the code is executed, the processor 1803 may implement the method 1200 performed by the network device in the method embodiments, which will not be repeated herein for brevity.

Those of ordinary skill in the art will appreciate that the unit and algorithm steps of the various examples described in combination with the embodiments disclosed herein may be implemented in electronic hardware, or a combination of computer software and electronic hardware. Whether these functions are performed in hardware or software depends on the specific application and design constraints of the technical solutions. A person skilled in the art may implement the described functions in different ways for each specific application, but such an implementation should not be construed to be beyond the scope of the present disclosure.

A person skilled in the art can clearly understand that for the convenience and brevity of the description, the specific working process of the system, the apparatus and the unit described above can refer to the corresponding process in the foregoing method embodiments, which will not be repeated herein.

In the several embodiments provided by the present application, it should be understood that the disclosed system, apparatus and method may be implemented in other manners. For example, the apparatus embodiments described above are merely illustrative. For example, the division of the units is only a division of logical functions. In actual implementation, there may be another division manner, for example, multiple units or components may be combined or integrated into another system, or some features may be omitted or not implemented. Moreover, the coupling, direct coupling or communication connection shown or discussed may be an indirect coupling or communication connection through some interfaces, apparatuses or units, and may be in electrical, mechanical or other form.

The units described as separate components may or may not be physically separated, and the components illustrated as units may or may not be physical units, that is, may be located in one place, or may be distributed to multiple network units. Some or all of the units may be selected according to actual needs to achieve the objectives of the solutions of the embodiment.

In addition, each functional unit in various embodiments of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, in essence, or the part contributing to the existing technology or the part of the technical solution may be embodied in the form of a software product, which is stored in a storage medium which includes several instructions for enabling a computer device (which may be a personal computer, a server, or a network device, etc.) to perform all or part of the steps described in methods in various embodiments of the present application. The above storage medium includes various media that can store program code, such as a U disk, a mobile hard disk, a read-only memory (ROM), a random access memory (RAM), a magnetic disk, or an optical disk.

The above is only specific implementations of the present application, the protection scope of the embodiments of the present application is not limited thereto, and changes or substitutions that can readily contemplated by anyone skilled in the art within the technical scope disclosed in the present application should be covered by the protection scope of the present application. Therefore, the protection scope of the present application should be subject to the protection scope of the claims.

What is claimed is:

1. A method for transmitting data, comprising:
   receiving, by a terminal device, first resource indication information transmitted by a network device, wherein the first resource indication information indicates a first frequency domain resource for transmitting a target channel in at least one time domain resource unit, a time domain resource for transmitting the target channel on a plurality of frequency domain resource units of the first frequency domain resource is the same, and the target channel comprises a data channel or a control channel of the terminal device; and
   receiving, by the terminal device, second resource indication information transmitted by the network device, wherein the second resource indication information indicates a time domain resource for transmitting the target channel on each of a plurality of frequency domain resource units of a second frequency domain resource in the at least one time domain resource unit, time domain resources for transmitting the target channel on the plurality of frequency domain resource units of the second frequency domain resource are at least partially different, and the second frequency domain resource is other frequency domain resource that can be used for channel transmission other than the first frequency domain resource.

2. The method according to claim 1, wherein the method further comprises:
   transmitting, by the terminal device, the target channel to the network device, or receiving, by the terminal device, the target channel transmitted by the network device, by using the same time domain resource on the plurality of frequency domain resource units of the first frequency domain resource, and transmitting the target channel to the network device or receiving the target channel transmitted by the network device by using the time domain resource indicated by the second resource indication information on the plurality of frequency domain resource units of the second frequency domain resource.

3. The method of claim 1, wherein the method further comprises:
   receiving, by the terminal device, information of the same time domain resource transmitted by the network device.

4. The method according to claim 1, wherein the information of the same time domain resource comprises at least one of the following:
   a starting symbol for the terminal device to transmit the target channel in the at least one time domain resource unit, a number of symbols for transmitting the target channel in the at least one time domain resource unit, a mini-slot for transmitting the target channel in the at least one time domain resource unit and a number of mini-slots for transmitting the target channel in the at least one time domain resource unit.

5. The method according to claim 1, wherein the information of the same time domain resource comprises an identifier of the same time domain resource, and the same time domain resource is a time domain resource corresponding to the identifier among a plurality of preset time domain resources.

6. The method according to claim 1, wherein the first frequency domain resource comprises a continuous frequency domain resource or a discontinuous frequency domain resource.

7. The method according to claim 1, wherein the same time domain resource is all time domain resources in the at least one time domain resource unit.

8. The method according to claim 1, wherein the time domain resource unit comprises any one of the following: a slot, a mini-slot and a subframe.

9. The method according to claim 1, wherein the data channel comprises any one of the following:
   an uplink data channel, a downlink data channel and a sidelink data channel.

10. A terminal device for transmitting data, comprising: a processor, a transceiver, and a memory, and the memory is configured to store an instruction, and the processor is configured to execute the instruction stored in the memory to control the transceiver to:
    receive first resource indication information transmitted by a network device, wherein the first resource indication information indicates a first frequency domain resource for transmitting a target channel in at least one time domain resource unit, a time domain resource for transmitting the target channel on a plurality of frequency domain resource units of the first frequency domain resource is the same, and the target channel comprises a data channel or a control channel of the terminal device; and
    receive second resource indication information transmitted by the network device, wherein the second resource indication information indicates a time domain resource for transmitting the target channel on each of a plurality of frequency domain resource units of a second frequency domain resource in the at least one time domain resource unit, time domain resources for transmitting the target channel on the plurality of frequency domain resource units of the second frequency domain resource are at least partially different, and the second frequency domain resource is other frequency domain resource that can be used for channel transmission other than the first frequency domain resource.

11. The terminal device according to claim 10, wherein the processor is further configured to execute the instruction stored in the memory to control the transceiver to:
    transmit the target channel to the network device by using the same time domain resource on the plurality of frequency domain resource units of the first frequency domain resource, and transmit the target channel to the network device by using a time domain resource unit indicated by the second resource indication information on the plurality of frequency domain resource units of the second frequency domain resource; and
    receive the target channel transmitted by the network device by using the same time domain resource on the plurality of frequency domain resource units of the first frequency domain resource, and receive the target channel transmitted by the network device by using the time domain resource unit indicated by the second resource indication information on the plurality of frequency domain resource units of the second frequency domain resource.

12. The terminal device according to claim 10, wherein the processor is further configured to execute the instruction stored in the memory to control the transceiver to:
receive information of the same time domain resource transmitted by the network device.

13. The terminal device according to claim 10, wherein the information of the same time domain resource comprises at least one of the following:
a starting symbol for the terminal device to transmit the target channel in the at least one time domain resource unit, a number of symbols for transmitting the target channel in the at least one time domain resource unit, a mini-slot for transmitting the target channel in the at least one time domain resource unit and a number of mini-slots for transmitting the target channel in the at least one time domain resource unit.

14. The terminal device according to claim 10, wherein the information of the same time domain resource comprises an identifier of the same time domain resource, and the same time domain resource is a time domain resource corresponding to the identifier among a plurality of preset time domain resources.

15. The terminal device according to claim 10, wherein the first frequency domain resource comprises a continuous frequency domain resource or a discontinuous frequency domain resource.

16. The terminal device according to claim 10, wherein the same time domain resource is all time domain resources in the at least one time domain resource unit.

17. The terminal device according to claim 10, wherein the time domain resource unit comprises any one of the following: a slot, a mini-slot and a subframe.

18. The terminal device according to claim 10, wherein the data channel comprises any one of the following:
an uplink data channel, a downlink data channel and a sidelink data channel.

19. The terminal device according to claim 10, wherein the processor is further configured to execute the instruction stored in the memory to control the transceiver to:
receive the first resource indication information transmitted by the network device through system information or radio resource control (RRC) signaling.

20. A network device, comprising: a processor, a transceiver, and a memory, and the memory is configured to store an instruction, and the processor is configured to execute the instruction stored in the memory to control the transceiver to:
determine a first frequency domain resource for transmitting a target channel in at least one time domain resource unit among frequency domain resources that can be used for channel transmission, wherein a time domain resource for transmitting the target channel on a plurality of frequency domain resource units of the first frequency domain resource is the same, and the target channel comprises a data channel or a control channel of the terminal device;
transmit first resource indication information to the terminal device, wherein the first resource indication information is used for indicating the first frequency domain resource in the at least one time domain resource unit; and
transmit second resource indication information to the terminal device, wherein the second resource indication information is used for indicating a time domain resource for transmitting the target channel on each of a plurality of frequency domain resource units of the second frequency domain resource in the at least one time domain resource unit, time domain resources for transmitting the target channel on the plurality of frequency domain resource units of the second frequency domain resource are at least partially different, and the second frequency domain resource is other frequency domain resource that can be used for channel transmission other than the first frequency domain resource.

* * * * *

UNITED STATES PATENT AND TRADEMARK OFFICE
CERTIFICATE OF CORRECTION

PATENT NO. : 10,952,207 B2
APPLICATION NO. : 16/576157
DATED : March 16, 2021
INVENTOR(S) : Yanan Lin et al.

Page 1 of 1

It is certified that error appears in the above-identified patent and that said Letters Patent is hereby corrected as shown below:

On the Title Page

(71) Applicant:
"GUANGDONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

(73) Assignee:
"GUANGDONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*